United States Patent
Sakthikumar et al.

(10) Patent No.: US 8,566,613 B2
(45) Date of Patent: Oct. 22, 2013

(54) MULTI-OWNER DEPLOYMENT OF FIRMWARE IMAGES

(75) Inventors: Palsamy Sakthikumar, Puyallup, WA (US); Robert C. Swanson, Olympia, WA (US); Vincent J. Zimmer, Federal Way, WA (US); Michael A. Rothman, Puyallup, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 12/814,246

(22) Filed: Jun. 11, 2010

(65) Prior Publication Data

US 2011/0307712 A1     Dec. 15, 2011

(51) Int. Cl.
    *G06F 11/30*     (2006.01)
(52) U.S. Cl.
    USPC .......................................... 713/189
(58) Field of Classification Search
    USPC .......................................... 713/189
    See application file for complete search history.

(56) References Cited

U.S. PATENT DOCUMENTS

| | | | |
|---|---|---|---|
| 5,844,986 | A | 12/1998 | Davis |
| 7,036,007 | B2 | 4/2006 | Schelling et al. |
| 7,069,452 | B1 | 6/2006 | Hind et al. |
| 8,245,307 | B1 * | 8/2012 | Pharris et al. ............. 726/27 |
| 2005/0125652 | A1 | 6/2005 | Singer et al. |
| 2006/0107071 | A1 | 5/2006 | Girish et al. |
| 2007/0294404 | A1 * | 12/2007 | Boutboul ................ 709/226 |
| 2007/0300068 | A1 | 12/2007 | Rudelic |
| 2008/0052698 | A1 | 2/2008 | Olson et al. |
| 2008/0126854 | A1 * | 5/2008 | Anderson et al. ............ 714/13 |
| 2010/0077199 | A1 | 3/2010 | Hobson et al. |

FOREIGN PATENT DOCUMENTS

| | | |
|---|---|---|
| JP | 2006058995 | 8/2004 |
| JP | 2004303209 | 10/2004 |
| JP | 2008305035 | 12/2008 |
| KR | 10-2003-0033396 A | 5/2003 |
| WO | 2011/156738 | 12/2011 |

OTHER PUBLICATIONS

Extended European Search Report received for European Patent Application No. 11169047.5, mailed on Aug. 18, 2011, 6 pages.
International Search Report and Written Opinion received for PCT application No. PCT/US2011/040020, mailed on Feb. 9, 2012, 9 pages.

(Continued)

*Primary Examiner* — Jacob Lipman
(74) *Attorney, Agent, or Firm* — Grossman, Tucker, Perreault & Pfleger, PLLC

(57) ABSTRACT

A method, apparatus, system, and computer program product for multi-owner deployment of firmware images. The method includes obtaining a signed firmware image that comprises a first code module signed by a first code owner and a second code module signed by a second code owner. The method further includes obtaining an updated first code module comprising updated code for the first code module, verifying that the updated first code module is signed by the first code owner, and updating the signed firmware image with the updated first code module in response to verifying that the updated first code module is signed by the first code owner. The signed firmware image may further comprise an access control list that authorizes updates to the first code module by the first code owner and updates to the second code module by the second code owner.

10 Claims, 5 Drawing Sheets

(56) References Cited

OTHER PUBLICATIONS

Korean Office Action from related Korean Application 10-2011-56330 filed Oct. 22, 2012.

Russian Office Action from related Russian Application 2011153332 mailed Mar. 7, 2013.

Japan Office Action from related application JP2011-130480 mailed Dec. 25, 2012.

Korean Office Action from related Korean Application 10-2011-56330 mailed Apr. 26, 2013.

* cited by examiner

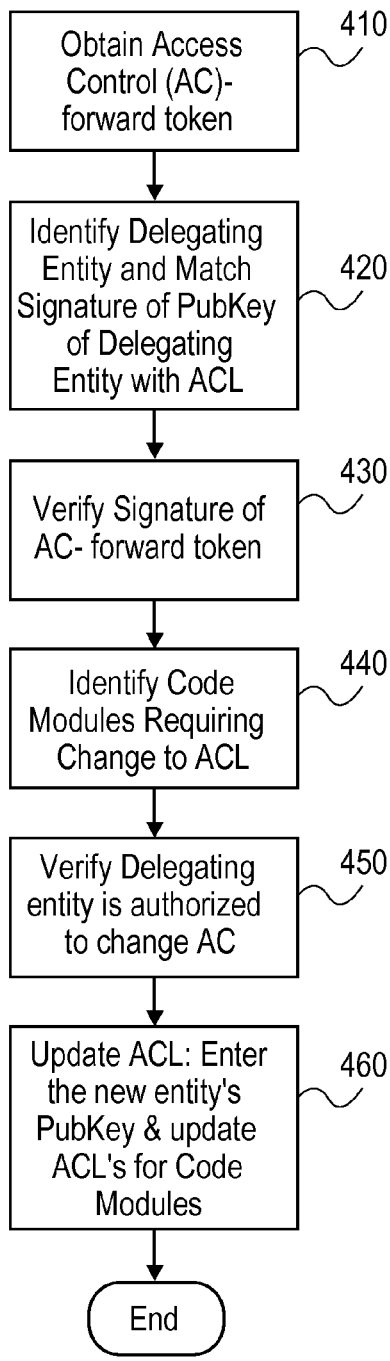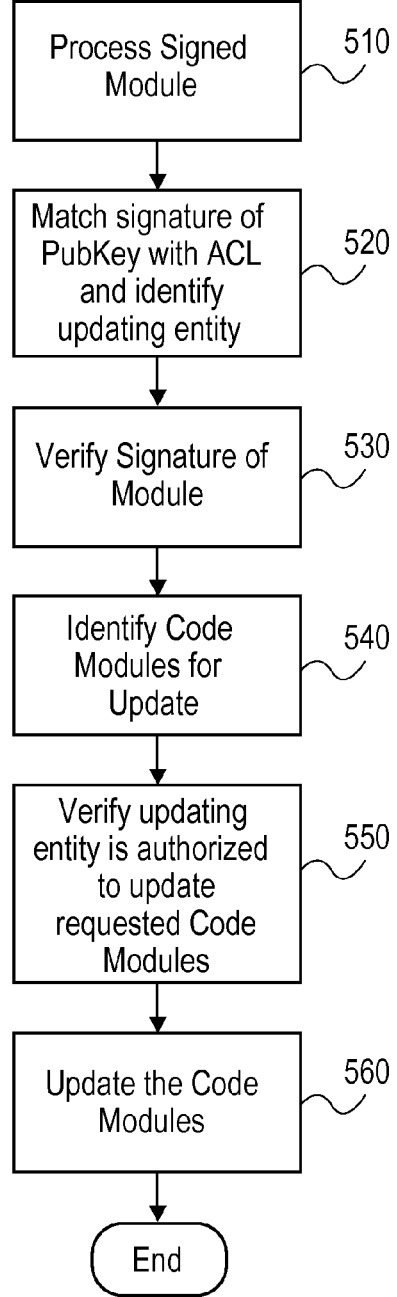
FIG. 4
FIG. 5

MULTI-OWNER DEPLOYMENT OF FIRMWARE IMAGES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to deployment of BIOS and other firmware code in computer systems.

BACKGROUND

Originally developed for IBM PC Compatible computers, the Basic Input/Output System (BIOS), also known as the System BIOS, is a de facto standard defining a firmware interface. The BIOS is boot firmware, designed to be the first code run by a PC when powered on. The initial function of the BIOS is to identify, test, and initialize system devices such as the video display card, hard disk, and floppy disk and other hardware. This initialization prepares the machine into a known state, so that software such as an operating system stored on compatible media can be loaded, executed, and given control of the PC. This process is known as booting, or booting up, which is short for bootstrapping.

BIOS programs provide a small library of basic input/output functions that can be called to operate and control the peripherals such as the keyboard, text display functions and so forth. When a system is powered on, BIOS checks system configuration settings and loads programs that act as translators between the hardware components and the operating system into memory. For example, when a user presses a key on the keyboard, the signal is sent to a keyboard interrupt handler, which tells the processor what it is and passes it on to the operating system.

BIOS was developed for the IBM PC at a time when processors functioned in a 16-bit processor mode and addressable memory was limited to one megabyte, and BIOS code reflected IBM PC AT hardware dependencies. Operating systems later developed for 32-bit processors began to include device drivers to handle I/O rather than rely on invoking the 16-bit runtime interface provided by BIOS. These device drivers are often provided by platform firmware and are loaded into memory during BIOS initialization prior to loading the operating system. Because of the large number of peripherals with which an operating system may interface, such platform firmware is often provided by entities other than the system manufacturer. As numerous parties become involved, the distribution of firmware images becomes complicated.

With the proliferation of malware in today's computing environments, the importance of verifying firmware has also increased. A digital signature or digital signature scheme is a mathematical scheme for demonstrating the authenticity of a digital message or document. A valid digital signature gives a recipient reason to believe that the message was created by a known sender, and that it was not altered in transit. Digital signatures are commonly used for software distribution and it is desirable that digital signatures be used for firmware image distribution.

BRIEF DESCRIPTION OF THE DRAWINGS

FIG. 4 is a flowchart of a method for updating an access control list for the signed firmware image of FIGS. 2A through 2F and 3 in accordance with one embodiment of the invention.

FIG. 5 is a flowchart of a method for updating the signed firmware image of FIGS. 2A through 2F and 3 in accordance with one embodiment of the invention.

DETAILED DESCRIPTION

Figure 1:
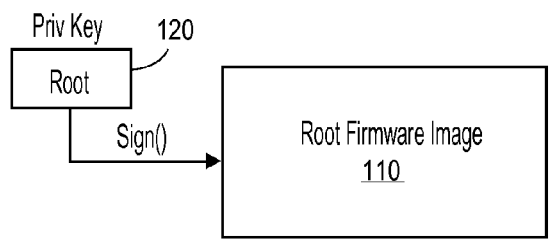
FIG. 1 is a block diagram of a prior art signed firmware image.

Embodiments of the present invention may provide a method, apparatus, system, and computer program product for deploying a signed root firmware image that includes code modules that are signed by different entities in the system distribution channel.

In one embodiment, a method includes obtaining a signed firmware image that comprises a first code module signed by a first code owner and a second code module signed by a second code owner. The method further includes obtaining an updated first code module comprising updated code for the first code module, verifying that the updated first code module is signed by the first code owner, and updating the signed firmware image with the updated first code module in response to verifying that the updated first code module is signed by the first code owner. The signed firmware image may further comprise an access control list that authorizes updates to the first code module by the first code owner and updates to the second code module by the second code owner.

The method may further include obtaining an access control token, wherein the access control token comprises a public key for a third code owner and authorization for the third code owner to update a third code module of the signed firmware image; verifying that the access control token is signed by an authorized code owner from the access control list; verifying that the authorized code owner is authorized to update the third code module; and updating the access control list to include the public key for the third code owner and the authorization for the third code owner to update the third code module. The method may further include receiving an updated third code module from the third code owner, verifying that the updated third code module is signed by the third code owner, and updating the signed firmware image with the updated third code module in response to verifying that the updated third code module is signed by the third code owner.

The present invention improves upon the traditional BIOS/platform firmware monolithic image update process and allows different owners to sign individual firmware code modules. The present invention enables updates to be performed for a specific BIOS/platform firmware code module/driver or an application. With platform firmware becoming increasingly sophisticated and providing critical functionality such as security features, defects in the BIOS and platform firmware can now be immediately corrected and provided by enterprise management servers rather than requiring an original equipment manufacture to provide a new monolithic image for the entire BIOS/platform firmware region of flash memory for the system.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

With advances in the sophistication of malware, it is desirable for providers of system software such as firmware images to certify that a given version of the firmware image is authentic and has not been subject to tampering. Such a certification is often provided as a digital signature of a firmware image file in accordance with a cryptographic scheme such as the Rivest Shamir Adleman (RSA) encryption algorithm, which provides public and private keys to encrypt and sign data. One of skill in the art will understand that the invention described herein is not limited to a digital signature under the RSA encryption algorithm, but that any method for providing a digital signature for certifying authenticity is within the scope of the invention.

A digital signature scheme typically consists of three algorithms: (1) A key generation algorithm that selects a private key uniformly at random from a set of possible private keys. The algorithm outputs the private key and a corresponding public key. (2) A signing algorithm which, given a message and a private key, produces a signature. (3) A signature verifying algorithm which given a message, public key and a signature, either accepts or rejects the message's claim to authenticity. Two main properties are required. First, a signature generated from a fixed message and fixed private key should verify the authenticity of that message by using the corresponding public key. Secondly, it should be computationally infeasible to generate a valid signature for a party who does not possess the private key.

FIG. 1 is a block diagram of a prior art signed firmware image. Root firmware image 110 is signed by a single entity's private key 120. Only the owner of private key 120 can update root firmware image 110. For example, assume that a system manufacturer has signed root firmware image 110 using the system manufacturer's private key 120. If updates to modules contained within the root firmware image 110 are needed by other entities in the deployment chain after root firmware image 110 is signed, such as by OEMs and channel customers, these entities must provide their customized firmware image code modules to the owner of private key 120 to be included in a subsequent release of root firmware image 110. Such an implementation requires an infrastructure for maintaining the customized firmware image modules and deploying the updated root firmware image 110 in accordance with schedules of outside entities.

A security breach permitted by a customized firmware image code module provided by an entity other than the owner of private key 120 compromises the security of the entire root firmware image 110. Such a security breach can be corrected only by the owner of private key 120. For this reason, most implementations today are signed only by entities at the lower end of the distribution channel. Root firmware image code modules provided by the system manufacturer and/or OEMs are often unsigned to avoid the problems described above. However, without a digital signature by the provider of many of the firmware image code modules, end users of the system may consider the firmware image to be less trustworthy.

Figure 2A:
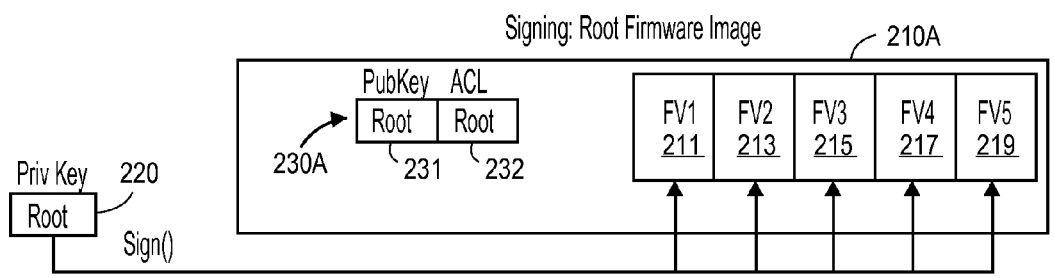
FIG. 2A is a block diagram of a firmware image signed by a root firmware code owner in accordance with one embodiment of the invention.

FIG. 2A is a block diagram of a firmware image signed by a root firmware code owner in accordance with one embodiment of the invention. In this example, an initial owner of the root firmware image, such as a system manufacturer (referred to herein as "Root"), has signed each of the firmware image code modules in five firmware volumes (FV1 211, FV2 213, FV3 215, FV4 217, and FV5 219) with root private key 220. Signing the code module may involve attaching the digital signature to the code module. In the examples shown herein, a signature for a code module is illustrated as a signature associated with a firmware volume containing the code module. Similarly, the authority to update a given code module is described as the authority to update a firmware volume containing the code module. One of skill in the art will understand that more than one code module may be contained in a given firmware volume, and that different code modules within a firmware volume may have different signatures and/or update authorities, but that for simplicity, a code module and firmware volume are described as having a one-to-one relationship herein.

Table 230A provides security information including a public key 231 for the root code owner "Root" and an Access Control List (ACL) 232 for the code owner "Root." ACL 232 indicates the firmware image code modules (i.e., firmware volumes) owned by public key 231. Further details about access control list 232 are provided in FIG. 2B.

Figure 2B:
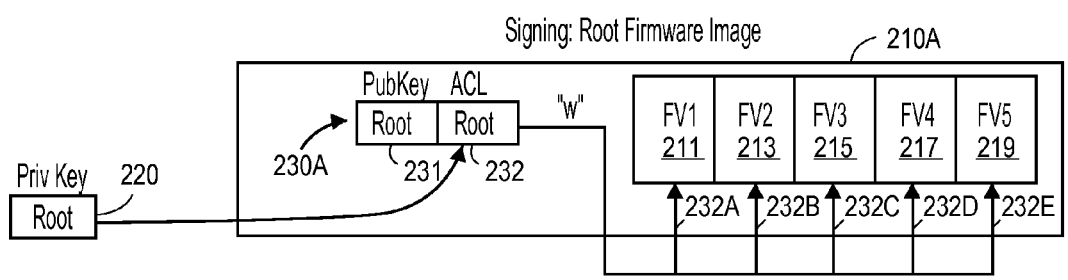
FIG. 2B is a block diagram of the firmware image of FIG. 2A showing an access control list for the root firmware code owner in accordance with one embodiment of the invention.

FIG. 2B is a block diagram of the firmware image of FIG. 2A showing an access control list for the root firmware code owner "Root" in accordance with one embodiment of the invention. In the example shown, ACL 232 contains pointers 232A through 232E to code modules in each of the five firmware volumes FV1 211, FV2 213, FV3 215, FV4 217, and FV5 219. These pointers are shown and explained in further detail with reference to FIG. 3 below.

Figure 2C:
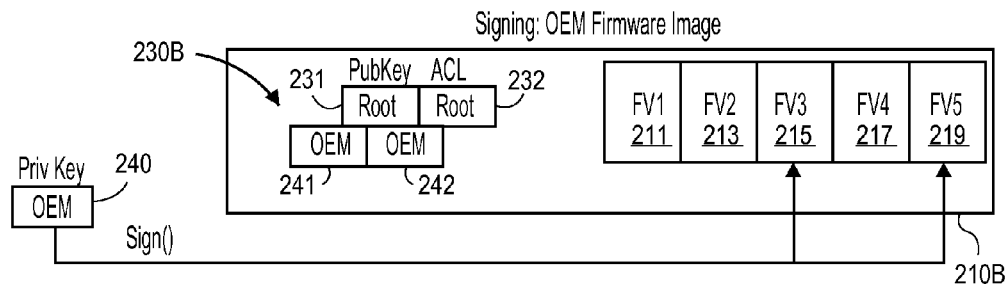
FIG. 2C is a block diagram of a firmware image signed by both a root firmware code owner and an OEM firmware code owner in accordance with one embodiment of the invention.

FIG. 2C is a block diagram of a firmware image signed by both a root firmware code owner and an OEM firmware code owner (referred to herein as "OEM") in accordance with one embodiment of the invention. In this example, a second owner of code modules of the firmware image, such as an OEM customer of the system manufacturer holding public key 220 in FIG. 2A, has provided customized root firmware modules. For example, an OEM firmware code owner may offer the computer system as a blade server product, and the firmware image code modules provided by the code owner "OEM" may configure the firmware to operate in a blade server configuration.

In FIG. 2C, the secondary owner "OEM" has signed selected firmware volumes within the firmware image, now referred to as OEM firmware image 210B, with the OEM private key 240. In this example, firmware volumes FV3 215 and FV5 219 have been signed by OEM private key 240. Table 230B provides new security information including public key 241 for the "OEM" code owner and an Access Control List (ACL) 242 indicating the firmware image code modules (i.e., firmware volumes) owned by public key 241. Further details about the ACL 242 are provided in FIG. 2D.

Figure 2D:
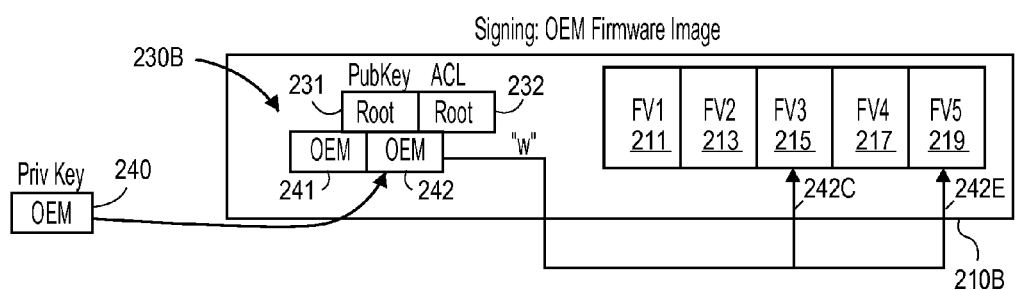
FIG. 2D is a block diagram of the firmware image of FIG. 2C showing an access control list for the OEM firmware code owner in accordance with one embodiment of the invention.

FIG. 2D is a block diagram of the firmware image of FIG. 2C showing an access control list for the "OEM" firmware code owner in accordance with one embodiment of the invention. In the example shown, ACL 242 contains respective pointers 242C and 242E to each of two firmware volumes FV3 215 and FV5 219. This new security information is a part of the table 230B, which also includes public key 231 and ACL 232 for the firmware code owner "Root" as described with reference to FIGS. 2A and 2B. However, the root firmware code owner "Root" delegates authority for the firmware code owner "OEM" to update FV3 215 and FV5 219, and pointers 232C and 232E of ACL 232 are overridden by pointers 242C and 242E of ACL 242. The process of delegating authority to update firmware code modules is described further with reference to FIGS. 3 through 5 below.

Figure 2E:
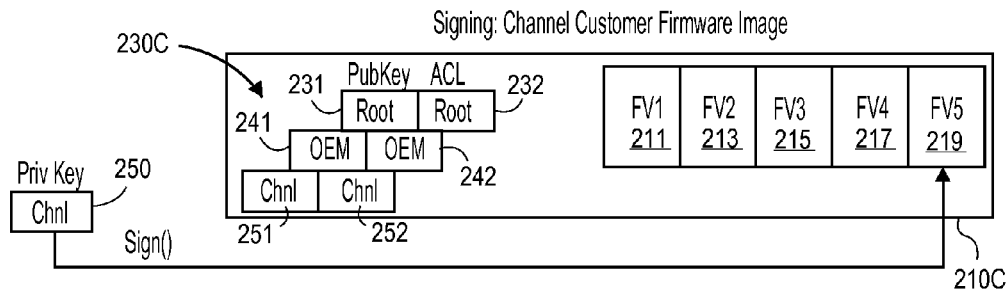
FIG. 2E is a block diagram of a firmware image signed by a root firmware code owner, an OEM firmware code owner, and a channel distributor firmware code owner in accordance with one embodiment of the invention.

FIG. 2E is a block diagram of a firmware image signed by a root firmware code owner "Root," an OEM firmware code owner "OEM," and a channel distributor firmware code owner "Chnl" in accordance with one embodiment of the invention. In this example, a third owner of code modules of the firmware image, such as an channel customer of the OEM holding private key 240 in FIG. 2B, has provided customized root firmware modules. The third owner "Chnl" has signed one firmware volume within the firmware image, now referred to as channel customer firmware image 210C, with the channel (Chnl) private key 250. In this example, firmware volume FV5 219 has been signed by Chnl private key 250. Table 230C provides new security information including public key 251 for the channel customer owner "Chnl" and an Access Control List (ACL) 252 indicating the firmware image code modules (i.e., firmware volumes) owned by public key 251.

Figure 2F:
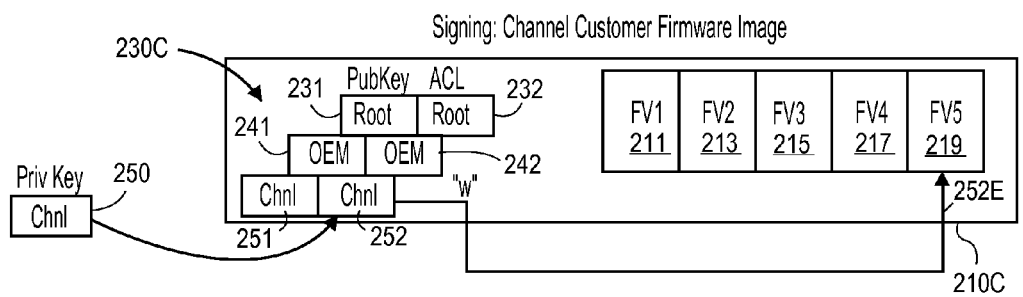
FIG. 2F is a block diagram of the firmware image of FIG. 2E showing an access control list for the channel distributor firmware code owner in accordance with one embodiment of the invention.

FIG. 2F is a block diagram of the firmware image of FIG. 2E showing an access control list for the channel distributor firmware code owner "Chnl" in accordance with one embodiment of the invention. In the example shown, ACL 252 contains pointer 252E to firmware volume FV5 219. This new security information is a part of the table 230C, which also includes public key 231 and ACL 232 for root firmware code owner "Root," as described with reference to FIGS. 2A and 2B, and public key 241 and ACL 242 for firmware code owner "OEM" as described with reference to FIGS. 2C and 2D. Pointer 252E overrides both pointers 232E of ACL 232 for firmware code owner "Root" and 242E of ACL 242 for firmware code owner "OEM."

Figure 3:
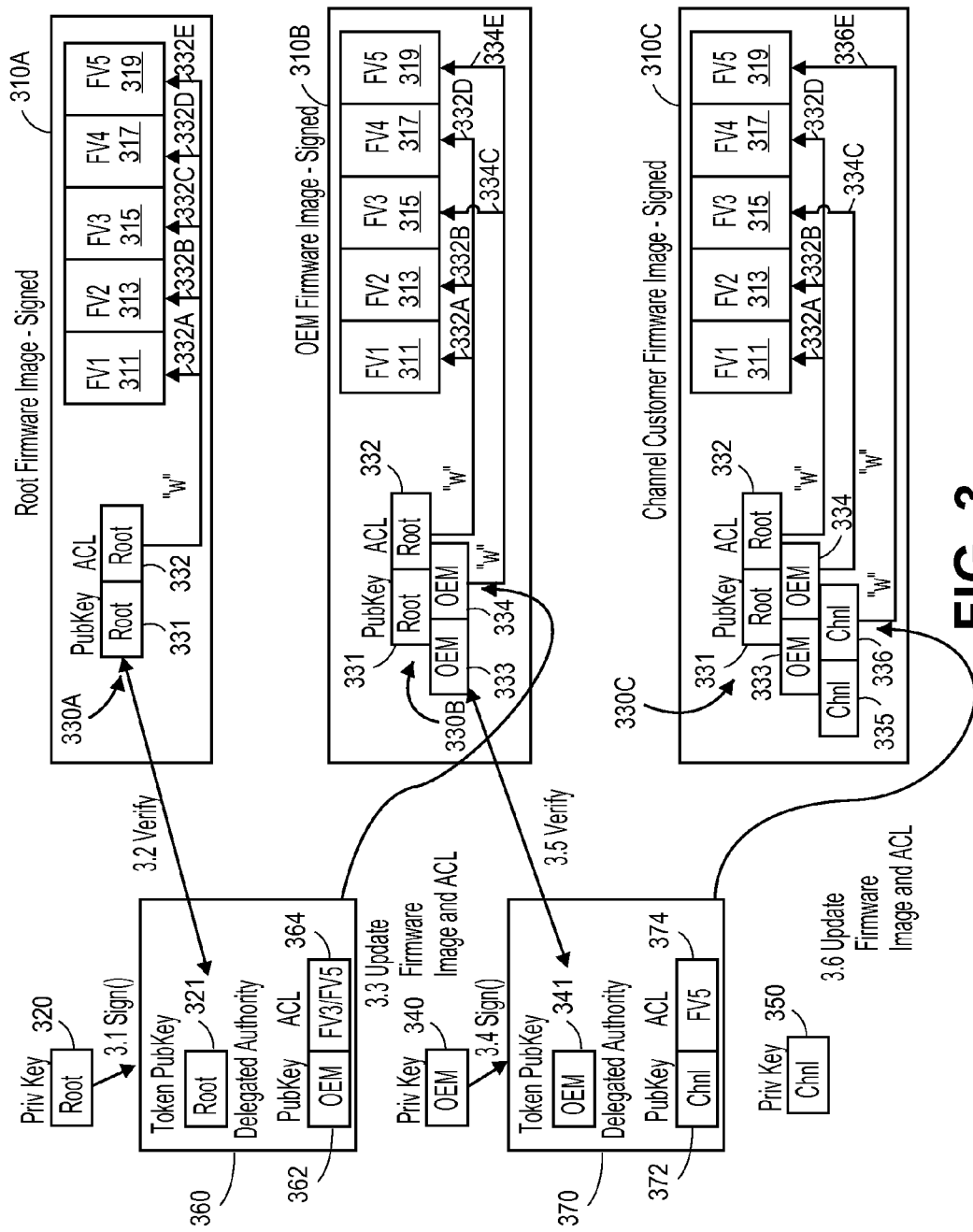
FIG. 3 is a flow diagram showing the process for signing and delegating authority for updating the signed firmware image of FIGS. 2A through 2F.

FIG. 3 is a flow diagram showing the process for signing and delegating authority for updating the signed firmware image of FIGS. 2A through 2F. Initially, root firmware image 310A has been signed by root firmware code owner "Root" as described with reference to root firmware image 210A of FIG. 2A. Table 330A indicates that an entity with public key 331 (which corresponds to the "Root" owner with private key 320) has an access control list 332 containing pointers 332A through 332E allowing the owner of public key 331 to update code modules contained in each of firmware volumes FV1 311, FV2 313, FV3 315, FV4 317, and FV5 319.

In action 3.1, the owner of private key 320, "Root," creates a signed token 360 in order to authorize subsequent updates of root firmware image 310A. By signing token 360, the owner of private key 320, "Root" firmware code owner, associates the "Root" public key 321 with token 360. Token 360 is created to include information for which authority is being delegated, such as a public key 362 of an entity authorized to update root firmware image 310A and an access control list 364 indicating the firmware modules within root firmware image 310A that can be updated by the corresponding public key 362. In this example, public key 362 for firmware code owner "OEM" has been included in token 360, with an access control list 364 allowing the owner of OEM public key 362 to update firmware volumes FV3 315 and FV5 319.

In action 3.2, before root firmware image 310A is updated, the authority sought to be delegated by token 360 is verified. Root firmware image 310A consults table 330A to ensure that the owner of the public key for token 360, i.e., the owner of token public key 321, "Root," is authorized to update the firmware volumes included within token 360. In this example, table 330A is consulted to ensure that the owner of the public key 321 for token 360 ("Root") appears in table 330A and that the owner of the public key 321 for token 360 ("Root") has the authority to update firmware volumes FV3 315 and FV5 319.

In action 3.3, after confirming that the owner of the public key 321 for token 360 "Root" has the authority to update firmware volumes FV3 315 and FV5 319, the code in FV3 315 and FV5 319 is updated to form OEM firmware image 310B. Table 330B within OEM firmware image 310B is also updated to include the public key for "OEM" firmware code owner as public key 333 and the corresponding Access Control List (ACL) 334. As a result of the update to Table 330B, the Access Control List now includes three pointers for the "Root" firmware code owner, pointers 332A to FV1 311, 332B to FV2 313, and 332D to FV4 317, and two pointers for the "OEM" firmware code owner, pointers 334C to FV3 315 and 334E to FV5 319.

In action 3.4, "OEM" firmware code owner (the owner of private key 340), creates a signed token 370 in order to authorize subsequent updates of OEM firmware image 310B. By signing token 370, the owner of private key 340, "OEM" firmware code owner, associates the "OEM" public key 341 with token 370. Token 370 is created to include information for which authority is being delegated, such as a public key 372 of an entity authorized to update OEM firmware image 310B and an access control list 374 indicating the firmware modules within OEM firmware image 310B that can be updated by the corresponding public key 372. In this example, public key 372 for firmware code owner "Chnl" has been included in token 370, with an access control list 374 allowing the owner of Chnl public key 372 to update firmware volume FV5 319.

In action 3.5, before OEM firmware image 310B is updated, the authority sought to be delegated by token 370 is verified. OEM firmware image 310B consults table 330B to ensure that the owner of the public key 341 for token 370 is authorized to update the firmware volumes included within token 370. In this example, table 330B is consulted to ensure that the owner of the public key 341 for token 370 ("OEM")

appears in table 330B and that the owner of the public key 341 for token 370 ("OEM") has the authority to update firmware volume FV5 319.

In action 3.6, after confirming that the owner of the public key for token 360 "OEM" has the authority to update firmware volume FV5 319, the code in FV5 319 is updated to form Channel Customer firmware image 310C. Table 330C within Channel Customer firmware image 310C is also updated to include the public key for "Chnl" firmware code owner as public key 335 and the corresponding Access Control List (ACL) 336. As a result of the update to Table 330C, the Access Control List now includes three pointers for the "Root" firmware code owner, pointers 332A to FV1 311, 332B to FV2 313, and 332D to FV4 317; one pointer for the "OEM" firmware code owner, pointer 334C to FV3 315; and one pointer for the "Chnl" firmware code owner, pointer 336E to FV5 319.

FIG. 4 is a flowchart of a method for updating an access control list for the signed firmware image of FIGS. 2A through 2F and 3 in accordance with one embodiment of the invention. The steps described in FIG. 4 are performed by an owner of an existing firmware image, such as signed root firmware image 310A of FIG. 3, to delegate authority to another entity to update the signed firmware image. The entity delegating authority to update the firmware image is referred to herein as the "delegating entity." In the previous examples of FIGS. 2A through 2F, the steps described in FIG. 4 would be performed by the "Root" firmware code owner to delegate authority to the "OEM" firmware code owner in actions 3.2 and 3.3. Similarly, the steps of FIG. 4 would be performed by the "OEM" firmware code owner to delegate authority to the "Chnl" firmware code owner in actions 3.5 and 3.6. The steps of FIG. 4 will operate to update an access control list of an existing firmware image, such as access control list 330A of root firmware image 310A or access control list 330B of OEM firmware image 310B.

In "Obtain Access Control (AC) Forward Token" step 410, an access control token such as token 360 or token 370 of FIG. 3 is obtained from the delegating entity. As described previously with reference to FIGS. 2A through 2F and FIG. 3, an access control token such as token 360 or token 370 of FIG. 3 may be created by one entity in the distribution channel to authorize a subsequent entity in the distribution channel to modify a given version of a firmware image. The access control token is signed using the private key of the delegating entity, and a public key of the delegating entity is therefore associated with the access control token. Once the access control token is obtained from the delegating entity in the distribution channel, control proceeds to "Identify Delegating Entity and Match Signature of PubKey of Delegating Entity with ACL" step 420.

In "Identify Delegating Entity and Match Signature of PubKey of Delegating Entity with ACL" step 420, the delegating entity is identified as the entity having signed the access control token. In the example of FIG. 3 at the point of performing action 3.2, the delegating entity is the "Root" firmware code owner. The public key associated with the access control token is matched against public keys appearing in the access control list of the firmware image for which update authority is to be delegated. If the public key associated with the access control token appears in the access control list of the firmware image, control proceeds to "Verify Signature of AC Forward Token" step 430.

At "Verify Signature of AC Forward Token" step 430, the public key for the delegating entity is used to verify the signature of the access control token. To perform this signature verification, a hash value may be computed from the signed access control token. The public key may also be used to decrypt the digital signature and the signed data, and then another hash value can be computed from the decrypted data. If the two computed hash values match, then the digital signature may be considered valid. After the signature of the access control token has been verified, control proceeds to "Identify Code Modules Requiring Change to ACL" step 440.

At "Identify Code Modules Requiring Change to ACL" step 440, the firmware volumes for which authority is to be delegated are identified. In the example of action 3.2, the firmware volumes identified in access control token 360 were firmware volumes FV3 315 and FV5 319. Once the firmware volumes are identified, control proceeds to "Verify Delegating Entity is Authorized to Change AC" step 450.

In "Verify Delegating Entity is Authorized Change AC" step 450, a determination is made whether the delegating entity is authorized to change the access control list of the existing firmware image. As described above, the delegating entity, "Root" firmware code owner, has been designated as the owner of the access control list for firmware volumes FV1 311 through FV5 319. Consequently, the delegating entity is authorized to change the access control list for these firmware volumes. Control then proceeds to "Update ACL: Enter the New Entity's PubKey and Update ACLs for Code Modules" step 460.

At "Update ACL: Enter the New Entity's PubKey and Update ACLs for Code Modules" step 460, the public key for the entity to whom authority is being delegated, "OEM" firmware code owner in this example, is added to the access control list, and access control lists for the firmware volumes FV3 315 and FV5 319 are updated. Authority for updates to firmware volumes FV3 315 and FV5 319 has been delegated to the "OEM" firmware code owner.

FIG. 5 is a flowchart of a method for updating the signed firmware image of FIGS. 2A through 2F and 3 in accordance with one embodiment of the invention. At "Process Signed Module" step 510, an existing firmware image such as root firmware image 310A receives a request to process a signed module. Processing the signed module may involve unwrapping information such as a number of firmware volumes included in the signed module and/or unwrapping a key used to sign the signed module. Each signed code module would be processed in accordance with the steps of FIG. 5. Control proceeds to "Match Signature of PubKey with ACL and Identify Updating Entity" step 520.

In "Match Signature of PubKey with ACL and Identify Updating Entity" step 520, the public key corresponding to the private key used to sign the signed module is compared to the access control list of the existing firmware image, and the updating entity is identified. If the public key for the signed module appears in the access control list of the existing firmware image, control then proceeds to "Verify Signature of Module" step 530.

At "Verify Signature of Module" step 530, the signature of the module is verified. To perform this signature verification, a hash value may be computed from the signed module. The public key may also be used to decrypt the digital signature and the signed data, and then another hash value can be computed from the decrypted data. If the two computed hash values match, then the digital signature may be considered valid. After the signature of the module has been verified, control proceeds to "Identify Code Modules for Update" step 540.

At "Identify Code Modules for Update" step 440, the code modules in the firmware volumes to be updated in the existing firmware image are identified. Once the code modules in the firmware volumes are identified, control proceeds to "Verify Updating Entity is Authorized to Update Requested Code Modules" step 550.

In "Verify Updating Entity is Authorized to Update Requested Code Modules" step 550, a determination is made whether the updating entity is authorized to update the requested firmware volumes. If the updating entity is authorized, control then proceeds to "Update the Code Modules" step 560. At "Update the Code Modules" step 560, the code modules in the existing firmware image are updated.

Figure 6:
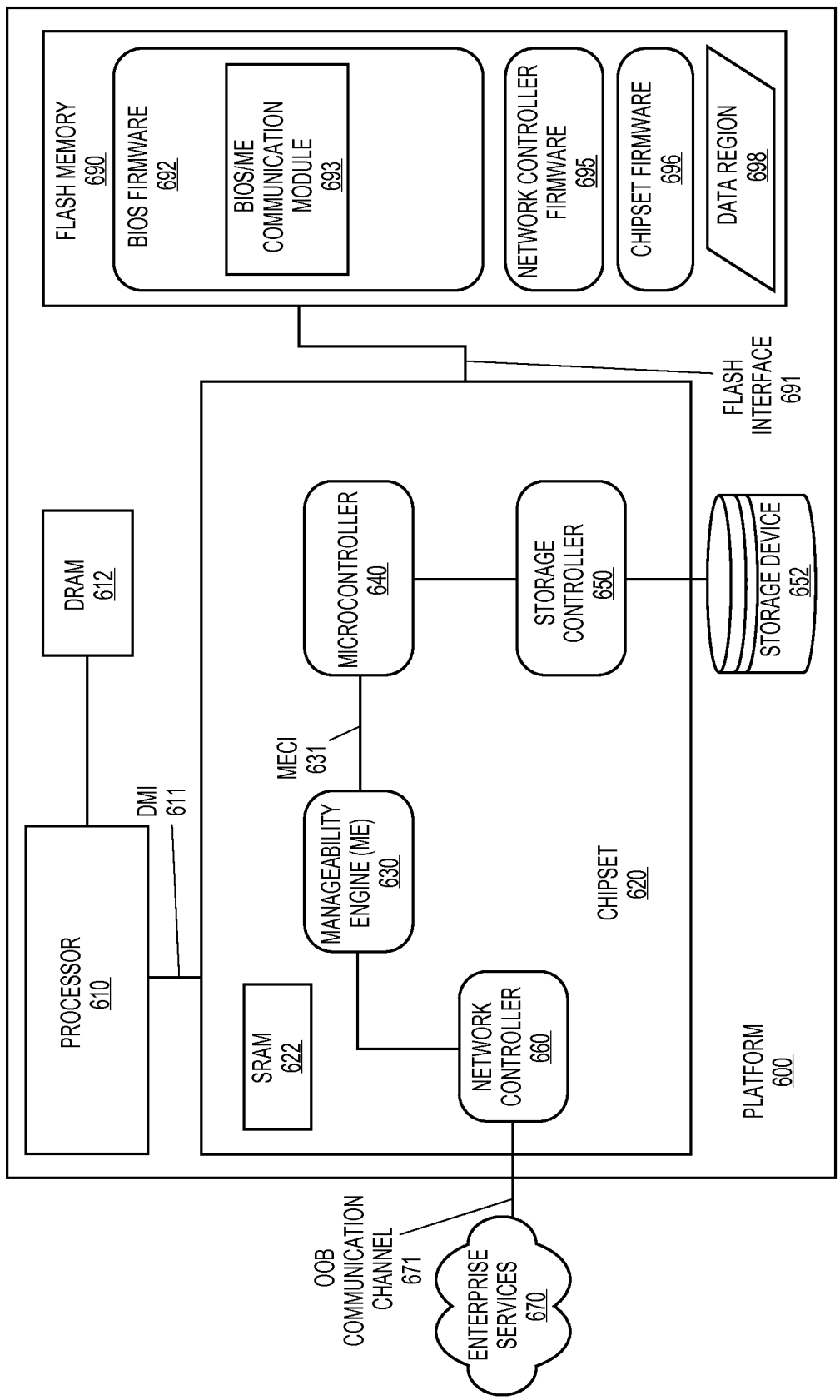
FIG. 6 is a block diagram of a system configured to enable firmware images to be signed by multiple tenants in accordance with one embodiment of the invention.

FIG. 6 is a block diagram of a system configured to enable firmware images to be signed by multiple code owners in accordance with one embodiment of the invention. Platform 600, which corresponds to a host computer system, includes a processor 610 connected to a chipset 620 via a desktop management interface (DMI) 611. Processor 610 provides processing power to platform 600 and may be a single-core or multi-core processor, and more than one processor may be included in platform 600. Processor 610 may be connected to other components of platform 600 via one or more system buses, communication pathways or mediums (not shown).

Chipset 620 includes a manageability engine (ME) 630, which may be implemented as an embedded microprocessor that operates independently of host processor 610, to manage the configuration and operation of platform 600. In one embodiment, processor 610 operates under the direction of a host operating system (not shown), whereas manageability engine (ME) 630 provides a secure and isolated environment that cannot be accessed by the host operating system. In one embodiment, manageability engine (ME) 630 authenticates users, controls access to peripheral devices, manages encryption keys for protection of data stored on storage devices of platform 600, and provides an interface to enterprise services 670 via network controller 660. Using enterprise services 670, manageability engine (ME) 630 maintains consistency with enterprise-wide policies for configuration and management of platforms such as platform 600, including providing a multi-owner signed firmware update manager in accordance with one embodiment of the invention. A multi-owner signed firmware update manager may be implemented as firmware executed by manageability engine (ME 630).

Communication between ME 630 and enterprise services 670 occurs via out-of-band communication channel 671. In one embodiment, out-of-band communication channel 671 is a secure communication channel between the manageability engine (ME) 630 on the host system and enterprise services 670 that manages the host system. The encryption/decryption keys to enable secure communication between platform 600 and enterprise services 670 may be stored in the flash memory 690 of FIG. 6 during manufacture of chipset 620 and manageability engine (ME) 630.

In the embodiment shown in FIG. 6, manageability engine (ME) 630 is coupled to a microcontroller 640 via a Manageability Engine Controller Interface (MECI) 631. In one embodiment, microcontroller 640 is a general-purpose controller that performs storage command decoding and other accelerated operations. In the embodiment shown, manageability engine (ME) 630 controls the behavior of microcontroller 640, which in turn controls the behavior of storage controller 650. Microcontroller 640 includes drivers for storage controller 650 as well as the logic related to any disk encryption functionality. Storage controller 650 is the controller for storage devices such as storage device 652 and enables microcontroller 640 and ME 630 to access data stored on storage device 652.

Platform 600 further includes memory devices such as dynamic random access memory (DRAM) 612, static random access memory (SRAM) 622 within chipset 620, and flash memory 690, as well as storage device 652 accessible via storage controller 650. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 652 may include mass storage devices such as integrated drive electronics (IDE) hard drives, and/or other devices or media, such as floppy disks, optical storage, tapes, flash memory, memory sticks, digital video disks, biological storage, etc.

Flash memory 690 is accessible by chipset 620 via flash interface 691. Data stored on storage device 652 and/or in memory devices DRAM 612, SRAM 622, and flash memory 690 may be encrypted.

Flash memory 690 contains firmware used to initialize platform 600. This initialization firmware includes Basic Input/Output System (BIOS) firmware 692 to identify and initialize system component hardware (such as the video display card and hard disk) and some other hardware devices including manageability engine (ME) 630. BIOS firmware 692 prepares system component hardware of platform 600 to operate in a known low capability state, so other software programs stored on various media, including an operating system, can be loaded, executed, and given control of platform 600. BIOS firmware 692 includes BIOS/ME communication module 693, which enables the initial configuration of manageability engine (ME) 630 during the boot process. In one embodiment, manageability engine (ME) 630 registers with BIOS/ME communication module 693 to receive a notification just before an operating system is loaded for platform 600. This notification enables manageability engine (ME) 630 to perform certain instructions in preparation for the operating system being loaded.

Flash memory 690 also includes network controller firmware 695 to configure network controller 660, and chipset firmware 696 to configure chipset 620. Flash memory 690 also contains a data region 698. In one embodiment, data region 698 is encrypted and may only be read by manageability engine (ME) 630. Information used by ME 630 to provide BIOS/boot firmware multi-owner management services may be stored in data region 698 of flash memory 690 or on storage device 652.

Processor 610 may also be communicatively coupled to additional components, such as video controllers, small computer system interface (SCSI) controllers, network controllers, universal serial bus (USB) controllers, input devices such as a keyboard and mouse, etc. Platform 600 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as network controller 660 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 600 may be controlled, at least in part, by input from conventional input devices, such as keyboards, mice, etc., and/or by commands received from another machine, biometric feedback, or other input sources or signals. Platform 600 may utilize one or more connections to one or more remote data processing systems (not shown), such as through a network interface controller (NIC) 660, a modem, or other communication ports or couplings.

Platform 600 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and nonvolatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for deploying multi-owner signed firmware. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
    obtaining a signed firmware image, the signed firmware image comprising at least a first code module signed by a first code owner and an access control list, wherein the access control list authorizes the first code owner to update the first code module;
    obtaining an updated first code module, the updated first code module comprising updated code for the first code module and an updated access control list delegating authority to update the first code module from the first code owner to a second code owner;
    verifying that the updated first code module is signed by the second code owner and that the second code owner is authorized to update based on, at least in part, the updated access control list; and
    updating the signed firmware image with the updated first code module in response to verifying that the updated first code module is signed by the second code owner and that the second code owner is authorized to update the first code module.

2. The method of claim 1, further comprising:
    obtaining an access control token, wherein the access control token comprises a public key for the second code owner and authorization for the second code owner to update the first code module of the signed firmware image;
    verifying that the access control token is signed by an authorized code owner from the access control list;
    verifying that the authorized code owner is authorized to update the first code module; and
    updating the access control list to include the public key for the second code owner and the authorization for the second code owner to update the first code module.

3. The method of claim 1 further comprising:
    verifying that the first code owner is authorized to update the first code module prior to updating the signed firmware image.

4. A system comprising:
    at least one processor; and
    a memory coupled to the at least one processor, the memory comprising instructions for performing the following:
        obtaining a signed firmware image, the signed firmware image comprising at least a first code module signed by a first code owner and an access control list, wherein the access control list authorizes the first code owner to update the first code module;
        obtaining an updated first code module, the updated first code module comprising updated code for the first code module and an updated access control list delegating authority to update the first code module from the first code owner to a second code owner;

verifying that the updated first code module is signed by the second code owner and that the second code owner is authorized to update based on, at least in part, the updated access control list; and updating the signed firmware image with the updated first code module in response to verifying that the updated first code module is signed by the second code owner and that the second code owner is authorized to update the first code module.

5. The system of claim 4, wherein the instructions further perform the following:

receiving an access control token, wherein the access control token comprises a public key for the second code owner and authorization for the second code owner to update the first code module of the signed firmware image;

verifying that the access control token is signed by an authorized code owner from the access control list;

verifying that the authorized code owner is authorized to update the first code module; and updating the access control list to include the public key for the second code owner and the authorization for the second code owner to update the first code module.

6. The system of claim 4 wherein the instructions further perform the following:

verifying that the first code owner is authorized to update the first code module prior to updating the signed firmware image.

7. A computer program product comprising:

a computer-readable storage medium; and instructions in the computer-readable storage medium, wherein the instructions, when executed in a processing system, cause the processing system to perform operations comprising:

obtaining a signed firmware image, the signed firmware image comprising at least a first code module signed by a first code owner and an access control list, wherein the access control list authorizes the first code owner to update the first code module;

obtaining an updated first code module, the updated first code module comprising updated code for the first code module and an updated access control list delegating authority to update the first code module from the first code owner to a second code owner;

verifying that the updated first code module is signed by the second code owner and that the second code owner is authorized to update based on, at least in part, the updated access control list; and updating the signed firmware image with the updated first code module in response to verifying that the updated first code module is signed by the second code owner and that the second code owner is authorized to update the first code module.

8. The computer program product of claim 7, wherein the instructions further cause the processing system to perform operations comprising:

receiving an access control token, wherein the access control token comprises a public key for the second code owner and authorization for the second code owner to update the first code module of the signed firmware image;

verifying that the access control token is signed by an authorized code owner from the access control list;

verifying that the authorized code owner is authorized to update the first code module; and updating the access control list to include the public key for the second code owner and the authorization for the second code owner to update the first code module.

9. The computer program product of claim 7 wherein the instructions further cause the processing system to perform operations comprising:

verifying that the first code owner is authorized to update the first code module prior to updating the signed firmware image.

10. A computer-implemented method comprising:

creating a signed firmware image by a first code owner, the signed firmware image comprising at least a first code module and an access control list, wherein the access control list authorizes the first code owner to update the first code module;

signing the first code module by the first code owner;

creating an access control token to delegate authority to update the first code module to a second code owner;

upon receiving an updated first code module comprising updated code for the first code module, verifying that the updated first code module is signed by the second code owner; and updating the signed firmware image with the updated first code module in response to verifying that the updated first code module is signed by the second code owner and that the second code owner is authorized to update based on, at least in part, the updated access control list.

* * * * *